US007417536B2

(12) United States Patent
Lakshmanan et al.

(10) Patent No.: US 7,417,536 B2
(45) Date of Patent: *Aug. 26, 2008

(54) LIVING BEING PRESENCE DETECTION SYSTEM

(76) Inventors: Sridhar Lakshmanan, 12420 Stanley Dr., Belleville, MI (US) 48111; Bing Ma, 3552 Green Brier Blvd., Apt. 456C, Ann Arbor, MI (US) 48105; Narasimhamurthi Natarajan, 2800 Lakehurst La., Ann Arbor, MI (US) 48105; Srini Naidu, 42503 Steeple View, Ann Arbor, MI (US) 48167

( * ) Notice: Subject to any disclaimer, the term of this patent is extended or adjusted under 35 U.S.C. 154(b) by 30 days.

This patent is subject to a terminal disclaimer.

(21) Appl. No.: 11/412,053

(22) Filed: Apr. 25, 2006

(65) Prior Publication Data

US 2007/0103328 A1    May 10, 2007

Related U.S. Application Data

(63) Continuation-in-part of application No. 11/392,463, filed on Mar. 28, 2006, and a continuation-in-part of application No. 10/799,401, filed on Mar. 12, 2004, now Pat. No. 7,019,641.

(60) Provisional application No. 60/674,914, filed on Apr. 25, 2005, provisional application No. 60/454,296, filed on Mar. 13, 2003.

(51) Int. Cl.
*G08B 1/08* (2006.01)

(52) U.S. Cl. ................. 340/538; 340/438; 340/439; 701/45

(58) Field of Classification Search ............. 340/538, 340/425.5, 438, 439, 457, 459, 460, 461; 701/45, 47
See application file for complete search history.

(56) References Cited

U.S. PATENT DOCUMENTS

| 5,886,697 | A | * | 3/1999 | Naughton et al. | 345/473 |
| 6,160,551 | A | * | 12/2000 | Naughton et al. | 715/769 |
| 6,249,698 | B1 | * | 6/2001 | Parris | 607/3 |

* cited by examiner

*Primary Examiner*—Daryl C Pope
(74) *Attorney, Agent, or Firm*—Rohm & Monsanto, PLC

(57) ABSTRACT

A system for distinguishing between a first condition corresponding to a living subject being directly in contact with an object of interest, and a second condition corresponding to the absence of contact between the living subject and the object of interest. A transducer, which may be a MEMs sensor, is disposed in predetermined relationship to the object of interest and produces a transducer signal responsive to a pressure wave resulting from the living subject being directly in contact the object of interest. A database stores data corresponding to the first condition and may contain additional data corresponding to the second condition. A processor calculates an algorithm of a non-linear short-term frequency-selective energy distribution of the transducer signal over time to produce transducer signal data. An arrangement, which may be a human listener or a processor system, determines a threshold between the first and second conditions in response to the transducer signal data and the first and second data. The direct contact may be a tap or stroking contact by a living subject. The transducer can be disposed within, or on the exterior of, the object of interest.

20 Claims, 11 Drawing Sheets

210

LIVING BEING PRESENCE DETECTION SYSTEM

RELATIONSHIP TO OTHER APPLICATION

This application is a continuation-in-part of U.S. Ser. No. 10/799,401, filed Mar. 12, 2004 now U.S. Pat. No. 7,019,641, which claims the benefit of U.S. Provisional Patent Application Ser. No. 60/454,296, filed Mar. 13, 2003, the disclosures of which are incorporated herein by reference. In addition, this application claims the benefit of U.S. Provisional Patent Application Ser. No. 60/674,914 filed Apr. 25, 2005, and U.S. Ser. No. 11/392,463, filed Mar. 28, 2006, the disclosure of which are incorporated herein by reference.

BACKGROUND OF THE INVENTION

1. Field of the Invention

The invention relates generally to systems that detect the presence of a living being in direct, physical communication with an object of interest, and more particularly, to the production a signal that contains information that indicates that a living being is in communication with the object of interest. The signal can be used to activate the object, such as a water faucet that is tapped or stroked by a human user; determination of whether the seat of a vehicle occupied with a human or other living being, or whether the vehicle seat is occupied with a non-human being (e.g., a box or a bag), or whether the seat is empty; determination when the seat is occupied by a human being whether the occupant is seated normally or leaning; determination of the presence of one or more human beings hidden or hiding within an enclosed space, such as a trailer, a cave, or an underground bunker; location of persons or animals trapped in a hazardous or hostile environment; and determination of the drowsiness of a human engaged in a dangerous task, such as the operation of an automobile or truck.

2. Discussion of the Related Art

In order that a front-seat passenger in a vehicle be protected in the event of a collision, motor vehicles are equipped with a front-seat passenger airbag. A necessary, but not entirely sufficient, condition for airbag deployment is that the front passenger seat be occupied. There are a number of systems for determining the presence of a human being in a vehicle seat. A typical detection system available in the art includes one or more sensing devices for measuring predetermined characteristics of a seat occupant. The sensed characteristics are used to determine whether a vehicle seat is occupied with a human subject, and further to determine whether to deploy the airbag. The weight of the occupant has been used in known arrangements as a fundamental parameter in this regard. More particularly, weight is used as a criterion to distinguish between a human-occupied seat and an empty seat. However, weight-based occupant detection systems have met challenges in calibration for different seat types, different operating environments, etc. There also are known systems for detecting occupancy of vehicle seats in which vision, infrared, or ultrasonic focal plane array sensors are used to gather occupant information. These sensors are mounted within the vehicle, but away from the seats, such as in the overhead console. However, since these sensors do not directly measure physical attributes they are not as reliable as those that do, and accordingly, occupant-sensing systems based on such sensors are more prone to errors than their weight-based counterparts. Occupant-sensing systems that use focal plane array technology also tend to be much more costly.

In another application of living being detection systems, unauthorized persons might endeavor to pass through entry checkpoints that have high security requirements (e.g., at airports, shipyards, border crossings, ballparks, concert halls, and secure or limited access areas such as military bases, power plants, nuclear plants, government buildings, etc.) by hiding, for example, in the trunk of an automobile or in a trailer. Conventional visual security checks are time-consuming and prone to fault due to human error and fatigue. An automatic living being presence detection system can reduce the workload for the guards and provide information about the inside of an enclosed space. An enclosed-space living being detection system developed at Lockheed Martin Energy Systems, Inc. detects the presence of human beings with geophones placed on the vehicle and employs wavelet analysis to the sensed data to determine if there are persons in the vehicle. This known system, as is the case with others, is capable of detecting human being presence, but it needs careful positioning and tuning of the sensors.

Enclosed spaces not only include boxed areas, but also areas that are hemispherical, tubular, etc. Examples of the other kind include caves, underground bunkers, tunnels, etc. A case in point is the ongoing anti-terrorism search for hidden/hiding criminals over the countryside and mountain ranges of certain foreign countries. The system proposed herein is useful in locating and capturing human beings who are hidden or hiding in caves, underground bunkers, tunnels, etc.

There is a need for a living being presence detection system that locates living beings buried under rubbles, trapped behind barriers, or inside buildings. After a disaster strikes, such as an earthquake, a hurricane, or a terrorist attack, living beings might be buried or trapped under rubble or behind large barriers. Similarly, there is a need to find living beings trapped indoors during a building fire. Rapid location of such persons can reduce the loss of life.

In a "life-detection system," living subjects are illuminated by penetrating microwave, and the reflected wave is modulated by the body movements, including the breathing and heartbeat. In this arrangement, the living being presence detection is accomplished by extracting the breathing and heartbeat component signals from the received microwave signal.

Drowsiness is a common attribute of humans engaged in repetitive monotonous tasks. When the task is, for example, the operation of an automobile or truck, the consequences of undetected drowsiness can be fatal. Previous approaches to the detection of drowsiness have relied on measuring eye closure, i.e., so-called "perclose." Although perclose can be a reliable measure of human drowsiness, it cannot be reliably estimated in operating conditions and requires very careful calibration for each human.

Heartbeat and breathing signals have been extensively used in detecting and monitoring living beings. In one known arrangement the author proposed a hand-held acoustic sensor pad that is placed on the subjects' upper chest to monitor heartbeat and breathing patterns. Since the water-filled sensor is excellently coupled with the living body, it is able to collect high signal-to-noise ratio heartbeat and breath signals. In another known arrangement, the life detection system utilizes active microwave sensors to acquire the heartbeat and breathing signals with a high signal-to-noise ratio. In both these cases, the acquired signal clearly shows the breathing and heartbeat patterns in time domain.

A problem incurred in inspection of cargo containers is that unauthorized persons, or stow-aways, might endeavor to cross a border or pass through entry checkpoints that have high security requirements (e.g., at airports, shipyards, border crossings, and secure or limited access areas such as military bases, power plants, nuclear plants, government buildings, etc.) by hiding in the container. In addition to unauthorized persons, weapons, bombs, or other contraband, may also be hidden in the same cargo containers.

Conventional visual security checks are time-consuming and prone to fault due to human error and fatigue. Moreover, in some cases, human intervention can be dangerous. In view of increased security concerns, methods of inspection employing strong radiation have been developed to guard against entry of dangerous weapons, for example. However, should the container also contain a stow-away, the level of radiation required to inspect for weapons, for example, is harmful, if not lethal. There is, therefore, a need for an automatic human being detection system that can be detected by a remote inspection.

In addition to the foregoing, there is a need for a method of detecting tampering with a cargo load that has already been inspected and/or sealed at a foreign location. Presently, United States customs inspects containers at the point of entry. However, the ability to inspect the containers abroad, seal them, and monitor whether the seal has been tampered with, would greatly expedite the flow of goods into the country. Thus, there is a need for a means of monitoring whether a sealed cargo container has been opened or tampered, at a remote location.

These problems are addressed by the present invention which provides a flexible film sensor, in the nature of an adhesive strip, that can detect human heart beats and breathing, as well as pressure changes, or vibrations, that would be indicative of tampering with the sealed container.

SUMMARY OF THE INVENTION

The foregoing and other objects are achieved by this invention which provides, in accordance with a first apparatus aspect, a system for distinguishing between a first condition corresponding to a living subject being directly in contact with an object of interest, and a second condition corresponding to the absence of contact between the living subject and the object of interest. In accordance with the invention, the system is provided with a transducer disposed in predetermined relationship to the object of interest, for producing a transducer signal responsive to a pressure wave resulting from the living subject being directly in contact the object of interest. There is additionally provided a database for storing first data corresponding to the first condition and second data corresponding to the second condition, and a processor for calculating an algorithm corresponding to a non-linear short-term frequency-selective energy distribution of the transducer signal over time to produce corresponding transducer signal data. Additionally, an arrangement is provided for determining a threshold between the first and second conditions in response to the transducer signal data and the first and second data.

In some embodiments, the system is configured to detect the direct contact between the living subject and the object of interest in the form of a tap contact by a human subject of the object of interest. In other embodiments, the direct contact between the living subject and the object of interest constitutes a stroke contact by a human subject of the object of interest.

The transducer, in certain embodiments of the invention, is an accelerometer. Of course, other forms of transducers, such as microphones or other acoustic sensors, may be used in the practice of the invention.

In some embodiments, the transducer is disposed within the object of interest. This is particularly useful when it is desired to activate the object of interest, which may be, for example, a water faucet, by simply touching same. The water faucet, in this specific illustrative embodiment of the invention, can be deactivated by a subsequent touching or stroking thereof, or in response to the expiration of a predetermined period of time.

In a further embodiment of the invention, there is provided a modulation system for translating a selected frequency component of the transducer signal to a translated frequency within the frequency range between 0 Hz and 20 kHz. In a specific illustrative embodiment of the invention, the signal to be detected in response to the direct communication of the living being with the object of interest originates from human heartbeat. Such a signal contains frequency components that are subsonic. The resulting signal is translated into the sonic range by heterodyning technique. In such an embodiment where the resulting signal is intended to be heard and analyzed by a human listener, there is further provided a training system for training the human listener to listen to the signal corresponding to the frequency-translated transducer signal and to distinguish between the first and second conditions.

The training routine to which the human listener is subjected is similar to that used by oceanographers to train subjects to listen to the sounds of the sea, and to distinguish therefrom the sounds of volcanic activity, the callings of sea creatures, the noises made by vessels, etc. Such ear training is generally of the type that is provided to submarine crew members assigned to listen to SONAR signals. A similar training is used for individuals who train to listen for sounds of intelligence in the search of extra terrestrial intelligence (SETI). Thus, for example, the present invention can be applied to listen for the heartbeat signals of living beings contained within a trailer or other enclosed space, without conducting visual inspection.

The energy distribution is, in certain embodiments, converted to a tone signal. For example, in certain embodiments of the invention, the modulation system comprises an amplitude modulator, having a carrier frequency in the range between 20 Hz to 20 kHz.

In accordance with a further aspect of the invention, there is provided a system for distinguishing between a first condition corresponding to a living subject of a species of interest being directly in contact with an object of interest, and a second condition corresponding to the absence of contact between the living subject and the object of interest, The system includes a transducer disposed in predetermined relationship to the object of interest, for producing a transducer signal that is responsive to a pressure wave that resulting from the heartbeat of the living subject. There is additionally provided a modulation system for translating the frequency of the transducer signal.

In one embodiment of this further aspect of the invention, a modulation system translates the transducer signal to a translated frequency within the frequency range between 0 Hz and 20 kHz.

A filter arrangement compares the transducer signal to stored heartbeat data that is, in some embodiments, stored in a database. The database therefore contains first data that corresponds to a heartbeat characteristic of the species of the living subject.

In a further embodiment, the filtering arrangement includes a processor for calculating an algorithm corresponding to a non-linear short-term frequency-selective energy distribution of the transducer signal over time to produce corresponding transducer signal data. A comparator arrangement compares the transducer signal data to the first data.

Further processing in the filtering arrangement further calculates an algorithm for producing data that corresponds to a non-linear short-term frequency-selective energy distribution of the transducer signal over time, and thereby produce corresponding transducer signal data. An arrangement is provided in some embodiments for determining a threshold between the first and second conditions in response to the transducer signal data and the first data. The database additionally may store second data corresponding to the characteristics of the second condition.

In accordance with a still further aspect of the invention, there is provided a system for distinguishing between a first condition corresponding to a living subject of a species of interest being directly in contact with an object of interest, and a second condition corresponding to the absence of contact between the living subject and the object of interest. In accordance with this aspect of the invention, there are provided a plurality of pressure transducers disposed in predetermined relationship to the object of interest, for producing respective transducer signals responsive to pressure waves resulting from the heartbeat of the living subject. A database stores data corresponding to a heartbeat characteristic of the species of the living subject. A processor calculates an algorithm corresponding to a non-linear short-term frequency-selective energy distribution of the transducer signals over time, and for comparing the frequency-selective energy distribution of the transducer signals to the data in the database. Additionally, there is provided an arrangement for determining a threshold for distinguishing between the first and second conditions.

To detect the presence of living subjects without intruding on their privacy or without being able to access them directly, the sensors of the detection system should be able to take advantage by remote operation of some reliable featured movement of the living body or its parts. The heartbeat signal inside the living body can propagate to the body surface and then generate a shock wave around the body. This wave can be used as evidence of the presence of a living being. Each time the heart beats it generates a small measurable shock wave, ballistocardiogram, that propagates through the body. This wave can be measured either with a sensor that is directly in contact with the living body or with a sensor that is not in direct contact with the body but that has a receiver that is appropriately positioned and oriented. Human breathing is similarly detectable. Pressure transducers are the sensors of choice for measuring such human heartbeat and breathing signals. Such pressure transducers include, for example, strain gauges, load cells, accelerometers, geophones, laser vibrometers, fiber-optic probes, microwave radiometers, etc.

In the applications of the present invention, the heartbeat and breathing signals are very weak compared to the ambient noise and therefore cannot be detected by examining the time domain signal alone. To overcome the extremely low signal-to-noise ratio ubiquitous to the application under discussion, a novel non-linear short-term frequency-selective energy distribution method is used to detect the presence of heartbeat and breathing signals embedded in the measured data. This novel method has the ability to detect weak heartbeat and breathing signals in a variety of different noises, e.g., wind, suspension rocking, road, etc.

The living being presence detection system accepts data from pressure transducers located in an area of interest. A novel short-term non-linear frequency-selective energy distribution method is applied to detect the existence of heartbeat and breathing signals in the measured data. This method, in conjunction with measurement transducers, forms a system for detecting the presence and absence of living beings in any reasonably enclosed space.

In one embodiment of the invention, the living being presence detection system distinguishes between living being-occupied and empty vehicle seats, and as such can be integrated into a driver/passenger restraint (seat-belt) and protection (airbag) system.

In another illustrative embodiment of the invention, the living being presence detection system determines the presence of living subjects in an enclosed space, such as a trailer, a vehicle trunk, etc. This detection capability is useful for entry point security screening purposes.

In yet another illustrative embodiment of the invention, the living being presence detection system locates and facilitates the rescue of living beings trapped under rubble, behind barriers, inside buildings, etc. With appropriately chosen and positioned pressure transducers, the heartbeat and breathing signal will be recorded, and with the non-linear short-term frequency-selective energy distribution method disclosed herein, the presence of living beings is detected.

In yet another exemplary embodiment of the invention, the living presence detection system can be used to detect human drowsiness/fatigue. This detection capability can be used to prevent accidents and loss of life when the human is engaged in dangerous activity such as driving an automobile or truck.

In a further illustrative embodiment of the invention, the living being presence detection system identifies whether a human vehicle seat occupant is properly seated—in-position (appropriately away from the airbag) or out-of-position (too close to the airbag).

Some of the distinguishing features of the living being presence detection system in accordance with the invention disclosed herein are its:

1. use of existing pressure transducer data in detecting living being presence in a vehicle seat;
2. distinguishing between a human being-occupied and an empty vehicle seat without requiring externally mounted focal plane array sensors, such as vision, infrared, ultrasonic sensors, etc.;
3. avoidance of the need for calibration and the ambiguity associated with weight-based seat occupancy detection systems;
4. real time inspection of an enclosed space;
5. utility in locating and facilitation of the rescue of trapped living beings in spaces that are difficult for human access such as debris/rubble, large barriers, burning buildings, etc.;
6. utility in locating and facilitation of the capture of living beings hidden/hiding in enclosed spaces such as caves, underground bunkers, tunnels, etc.;
7. ability to detect drowsiness and fatigue in humans engaged in monotonous or tedious tasks, and
8. robust non-linear short-term frequency-selective energy distribution analysis and appearance-recognition methodologies for weak signal, large noise, and varying operating conditions.

BRIEF DESCRIPTION OF THE DRAWINGS

Comprehension of the invention is facilitated by reading the following detailed description in conjunction with the annexed drawings, in which.

DETAILED DESCRIPTION

1. Data Acquisition

Figure 1A:
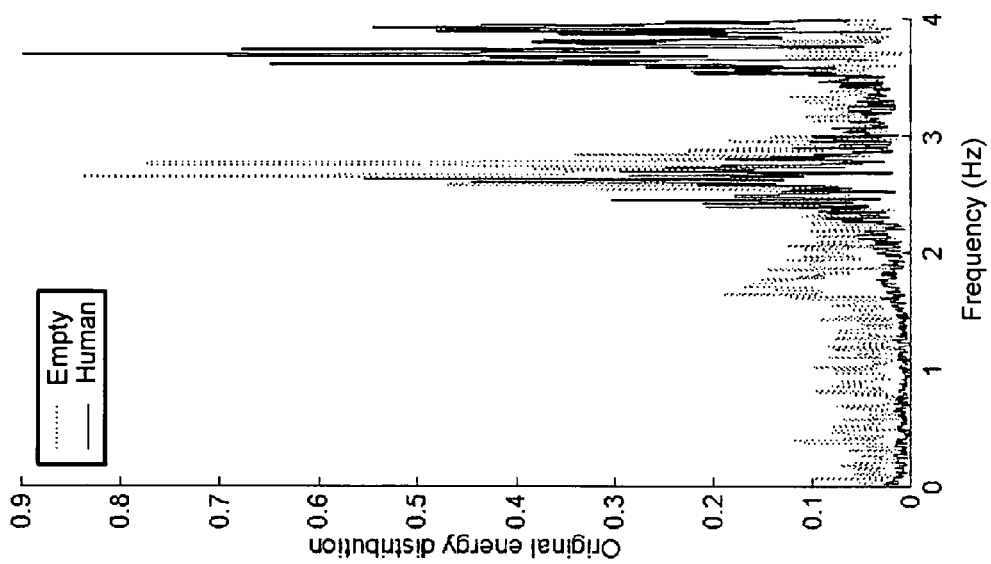
FIGS. 1a and 1b are graphical representations that illustrate the energy distribution across various frequencies of human-being-present and empty signals in a vehicle seat occupancy detection application.

Each time the heart beats the ballistocardiogram propagates through the human body, through the media between the human body and the measurement transducer, and is eventually recorded by the transducer. The same is true of the human breathing signal. The media between the human body and the measurement transducer vary tremendously across the different applications Such media often includes the seat cover, cushion, and seat frame combination in vehicle seat occupancy detection applications; the vehicle body that encloses the trailer or the trunk space in entry point inspection applications; the rubble surface or the glass pane window in search and rescue applications; or the earth or the outer wall in search and capture applications. Since ballistocardiogram and breathing signals propagate in these media with different attenuations, the selection of the transducers that measure these signals is application dependent. For example, the vehicle seat occupancy application uses a load cell, accelerometers, strain gauges, etc.; the entry point security screening application uses geophones, acoustic pads, etc.; the locate and rescue or capture applications use geophones, fiber-optic probes, laser vibrometers, microwave radiometers etc. No matter which transducer is used, they all produce at their respective outputs a real-valued signal sequence data over time. The data is subsequently processed by the human being presence detection system.

2. Human Being Presence Detection Algorithm

The nature of the data recorded will vary considerably across the gamut of pressure transducers. In particular, the strength of the heartbeat and breathing signals will depend on the location/proximity of the human being, the media between the human being and the transducer, the sensitivity of the transducer, and its frequency response. The environments in which these transducers operate could introduce a variety of noise signals of varying strengths and energy distributions. However, all such measured data do provide information about the presence of human beings, and the redundant and complementary nature of these transducers allows us to improve the accuracy and reliability of human being presence detection with data fusion techniques.

There are several categories of data fusion methods based on the stage at which the fusion is performed, namely, signal-based, feature-based and decision-based. Since the sensors in the present detection setting are conditionally independent in their sensing capability, decision-based fusion is the method of choice. In decision-based fusion, each sensor makes a separate detection decision. These decisions are then combined using voting techniques, as described hereinbelow:

Let $x_i([n]t_{s_i})$ denote the signal obtained with the $i^{th}$ sensor at sampling time instant $nt_{s_i}$ where $i=1, 2, \ldots, I$, and $I$ is the total number of sensors. At any sampling instant $n_0$, a decision regarding the presence/absence of human beings will be made based on the previous $N_i$ signal samples received:

$$\bar{x}_i(n_0) = [x_i([n_0-N_i+1]t_{s_i}), x_i([n_0-N_i+2]t_{s_i}), \ldots, x_i([n_0]t_{s_i})]^T.$$

Where $N_i$ is determined by the sampling rate $t_{s_i}$ of the $i^{th}$ signal, with the assumption that the energy distribution of $N_i$ continuous samples of the measured signal $x_i([n]t_{s_i})$ will provide enough information about the existence of heartbeat and breathing in $\bar{x}_i(n_0)$.

Figure 1B:
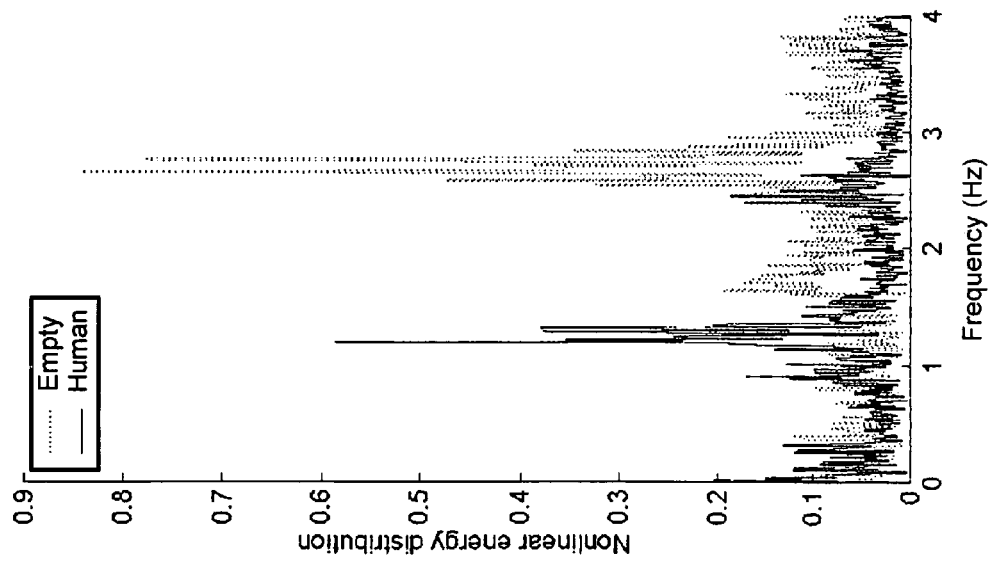
Figure 2A:
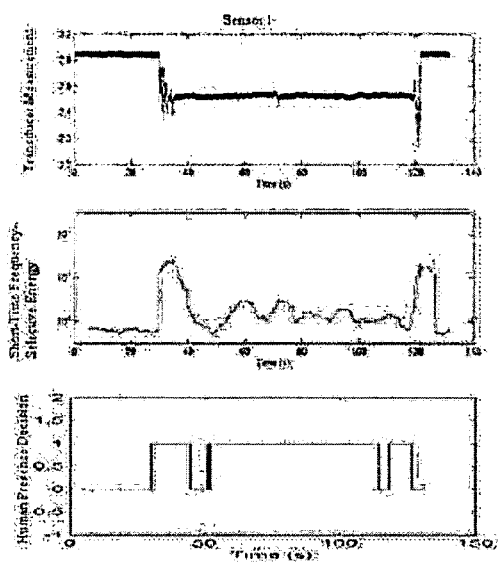
FIGS. 2a, 2b, 2c, and 2d are graphical representations that illustrate the signal data obtained from four pressure transducers (sensors 1-4, respectively), illustratively in the form of load cells, their corresponding short-time frequency-selective energy distribution, and an individual human being presence/absence decision.
Figure 2B:
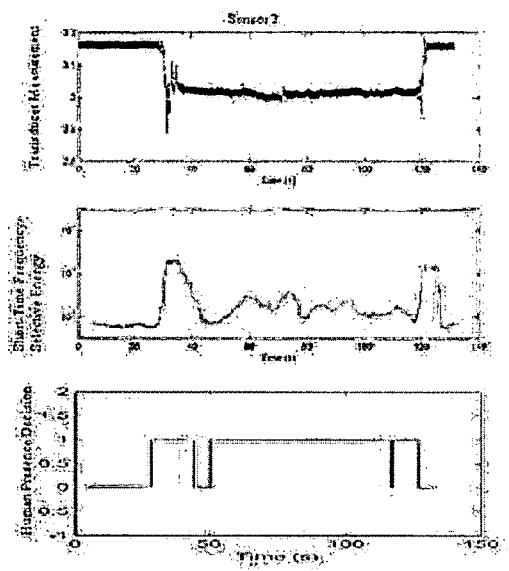
Figure 2C:
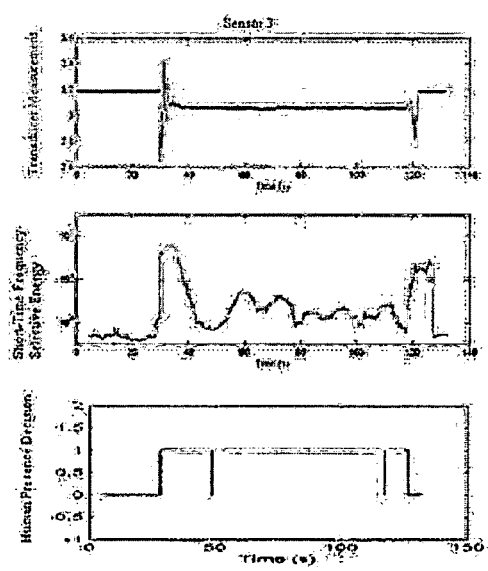
Figure 2D:
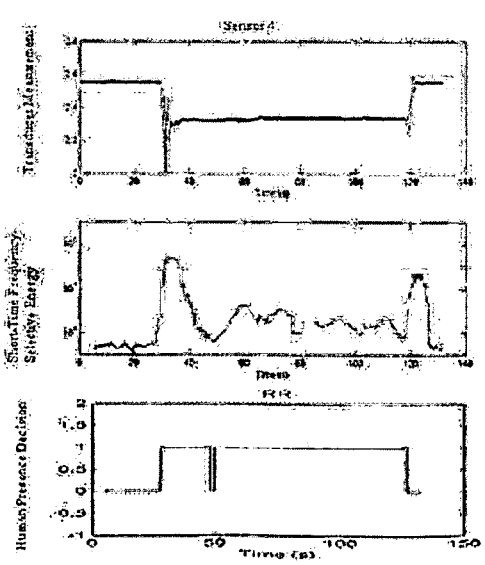

The $N_i$-point non-linear discrete Fourier transform of the signal $\bar{x}_i(n_0)$ is given by:

$$X_{n_0}^i(k) = \frac{1}{\sqrt{N_i}} \sum_{n=n_0-N_i+1}^{n_0} f[x_i(n)] e^{-j\frac{2\pi(n-n_0+N_i-1)k}{N_i}}, k = 0, 1, 2, \ldots, N_i - 1$$

Where $f[.]$ denotes the mean-subtraction operation, followed by a non-linear operation such as the absolute value of the mean subtracted signal. FIG. 1a illustrates the energy distribution across various frequencies when there's human present versus empty. It is obvious that the signal containing a heartbeat concentrates its energy in select frequencies in the 1-2 Hz frequency range. In this application, it turns out that noise signals—wind, suspension rocking, road, etc.—result in a signal components of very low frequency, mostly under 1 Hz or over 2 Hz. To be immune of such low frequency noise, the human presence detection algorithm will focus on the frequency range from 0 to 4 Hz. For comparison, FIG. 1b illustrates the energy distribution of the original signal over the same band of frequencies. The effectiveness of the non-linear operation is clear.

Let $\Gamma$ denote the select frequencies over which the human heartbeat and breathing signals have sufficient/discernible energies. The non-linear normalized energy distribution of $\bar{x}_i(n_0)$ over these select frequencies of $\Gamma$ is given by $X_{n_0}^i = \{\|X_{n_0}^i(k)\|^2, k \in \Gamma\}$. If $\Gamma$ is selected carefully, the short-term frequency-selective energy of the measured signal is a good discriminant between the presence and absence of human heartbeat and breathing signals in the measurement.

As an example, let $$e_i(n_0 t_{s_i}) = \frac{1}{|\Gamma|} \sum_{k \in \Gamma} \|X_{n_0}^i(k)\|^2,$$

We call $e_i(n_0 t_{s_i})$ non-linear short-term frequency-selective energy of the measured signal at time instant $n_0 t_{s_i}$. An appropriate threshold $E_t$ can be used to determine the presence of a human, i.e., if $e_i(n_0 t_{s_i}) > E_t$, then $d_i(n_0 t_{s_i}) = 1$, which means that the presence of human is detected; otherwise, $d_i(n_0 t_{s_i}) = 0$, which means that no human is detected in the transducer measurement.

When the above individual sensor detection algorithm is applied to measurement data obtained from all the fielded sensors, at any instant in time I independent decisions are available. To make the most of all the sensor measurements, a decision-based data fusion approach is employed. A voting technique is employed to integrate the individual decisions. A variety of voting techniques are available:

$$\text{At least one } \sum_{i=1}^{I} d_i(n_0 t_{s_i}) \geq 1,$$

$$\text{Majority } \sum_{i=1}^{I} d_i(n_0 t_{s_i}) \geq I/2,$$

$$\text{All } \sum_{i=1}^{I} d_i(n_0 t_{s_i}) = I, \text{ etc.}$$

3. Human Being Presence Detection Results

The human being presence detection algorithm described above has been applied to the vehicle seat occupancy detection application. FIG. 2 shows the signal data from the four pressure transducers (load cells), their corresponding short-time frequency-selective energy distribution, and the individual human being presence/absence decision. The composite decision obtained by fusing all four individual decisions is shown in FIG. 3. As a comparison, the weight of the occupant calculated from the load sensors is provided. It can be seen that the detection result matches well with the weight calculation. FIG. 4 provides a more general result of human being presence detection using the invention disclosure herein. A single pressure transducer is used to record measurements of the human heartbeat and breathing signal when the human being enters and exits an area of interest and also when a human being-like dummy is placed instead of the human being. Notice that the time domain signal offers virtually no discrimination between the various situations, whereas the short-time frequency-selective energy offers an excellent discrimination.

4. Occupant Pose Classification Algorithm

Once a human being is determined to be present in the enclosed space of interest, other characteristic of the human being are also of interest. For example, in the vehicle seat occupancy application, once it has been determined that the seat is occupied by a human being, whether the occupant is normally seated or leaning is also of interest. It is envisioned that if the occupant is normally seated then the airbag will be deployed with full force, whereas if the occupant is leaning the airbag will be deployed with lower power or not at all.

Categorization of the detected human being is also done using the short-time measured signal $\bar{x}_t(n_0)$. Details follow:

4.1 Database, Dimensionality Reduction, and Signal Representation

Let $\bar{y}(n_0) = [X_{n_0}^1, X_{n_0}^2, \ldots, X_{n_0}^I]$. For simplicity and clarity of further description, we will not specify time $n_0$ where no ambiguity rises, i.e., $\bar{y} = [X^1, X^2, \ldots, X^I]$. A training set T consists of samples of $\bar{y}$ for the various human being categories. Let $m_1, m_2, \ldots, m_c$ represent the number of samples of $\bar{y}$ in each of the c human being categories, $T_1, T_2 \ldots T_c$ denote the partition of the training samples into c categories (i.e., $T = T_1 \cup T_2 \ldots \cup T_c$), and M denote the total number of samples in T. Let t represent the corresponding human being category for each training sample $\bar{y}$.

Using a Fisherbasis algorithm, we compute a projection matrix P to project the training samples T onto a much lower dimensional space $\Re^c$. Computation of the projection matrix involves $$\bar{\mu}_i = \sum_{\bar{y}_j \in T_i} \bar{y}_j / m_i,$$

$$i = 1, 2, \ldots c,$$

$$S_W = \sum_{i=1}^{c} \sum_{\bar{y}_k \in T_i} (\bar{y}_k - \bar{\mu}_i)(\bar{y}_k - \bar{\mu}_i)^T, \text{ and}$$

$$S_B = \sum_{i=1}^{c} m_i(\bar{\mu}_i - \bar{y}_{avg})(\bar{\mu}_i - \bar{y}_{avg})^T, \text{ where}$$

$$\bar{y}_{avg} = \sum_{j=1}^{M} \bar{y}_j / M$$

is the average signal vector. The projection matrix P is chosen so that $(PS_W P^T)^{-1}(PS_B P^T)$ is maximized. This amounts to computing the eigenvectors of the matrix $S_W^{-1} S_B$, which is a large N×N matrix (where N denotes the length of $\bar{y}$) whose eigenvectors are not easily determined. An alternate strategy for computing of P is pursued.

Let $Z = [\bar{y}_i - \bar{y}_{avg}, i = 1, 2, M]$ be an N×M dimensional matrix of zero mean short-time measurements. The covariance matrix of Z is then given by $C = ZZ^T$, a N×N matrix. The alternate strategy for computing P involves finding the eigenvectors of C. In reality, since M<<N, the eigenvectors of the M×M matrix $Z^T Z$ is found. The non-zero eigenvectors $e_1, e_2, \ldots, e_M$ of the covariance matrix C are then computed as $Z \cdot eig(Z^T Z)$. The vectors $e_1, e_2, \ldots, e_M$ are typically called eigenbases, which are unit norm and sorted in the order of decreasing eigenvalues. If $P_E = [e_1, e_2, \ldots, e_{M-2}]$ is the matrix of eigenbases corresponding to the M−2 largest eigenvalues, then the matrices $\bar{S}_W = P_E^T S_W P_E$ and $\bar{S}_B = P_E^T S_B P_E$ are effective measures of $S_W$ and $S_B$ in the eigenspace. Finally, the Fisher projection matrix P is computed as $P = eig(\bar{S}_W^{-1} \bar{S}_B)$.

Once the projection matrix P is computed, each of the training signals $\bar{y}_j$ can be projected onto a lower-dimensional vector as follows: $\bar{p}_j = P^T \bar{y}_j$.

4.2 Classification

Given the non-linear energy spectrum measurement signal $\bar{y}$, with human presence, it is first projected onto a lower-dimensional space using $P - \bar{p} = P^T \bar{y}$. The human category of $\bar{y}$ is decided by a nearest-neighbor classification of the low-dimensional vector $\bar{p}$.

FIGS. 1a and 1b are graphical representations that illustrate the energy distribution across various frequencies of human-being-present and empty signals in a vehicle seat occupancy detection application. FIG. 1a illustrates the energy distribution using the preferred nonlinear energy distribution methodology of the present invention, and FIG. 1b illustrates the original energy distribution. It is evident that the distinction between an empty environment (dotted graph) and the same environment occupied by a human (continuous line graph) is significantly more evident in the nonlinear energy distribution analysis.

FIGS. 2a, 2b, 2c, and 2d are graphical representations that illustrate the signal data obtained from four pressure transducers (sensors 1-4, respectively), illustratively in the form of load cells, their corresponding short-time frequency-selective energy distribution, and an individual human being presence/absence decision.

Figure 3A:
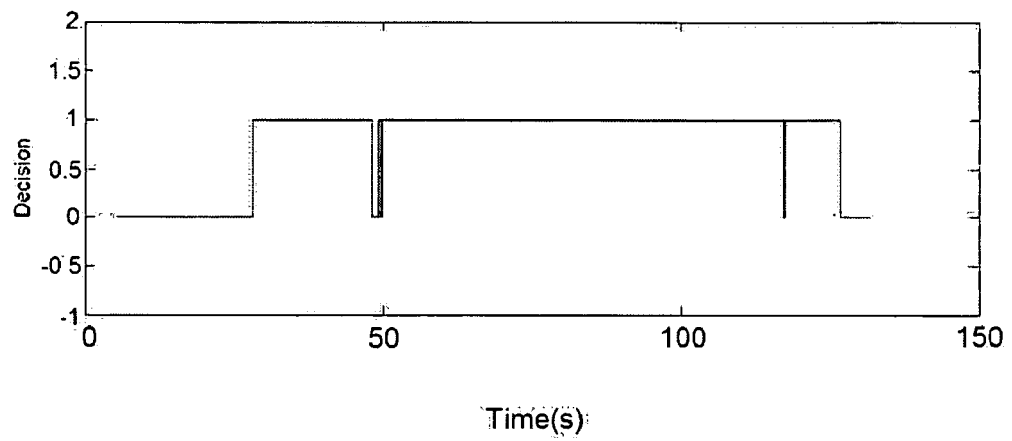
FIGS. 3a and 3b are graphical representations that illustrate the composite decision obtained by fusing all four individual decisions.
Figure 3B:
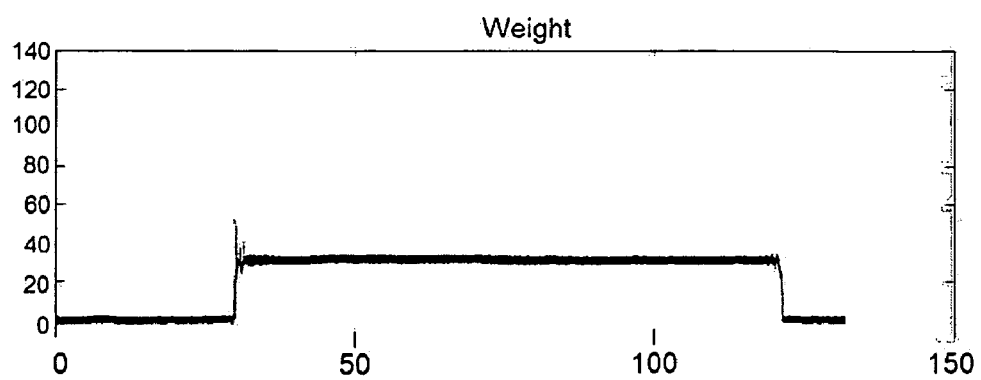

FIGS. 3a and 3b are graphical representations that illustrate the composite decision obtained by fusing all four individual decisions determined in FIGS. 2a, 2b, 2c, and 2d. As shown, using the nonlinear energy distribution analysis of the present invention results in a consistent unequivocal determination of presence decision making using all four transducers.

Figure 4A:
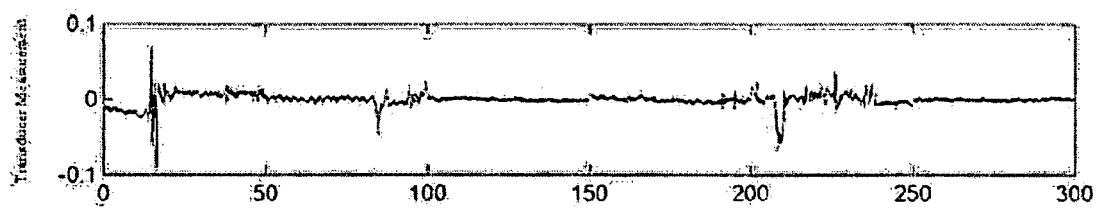
FIGS. 4a, 4b, 4c, and 4d are graphical representations that illustrate a general result of human being presence detection in accordance with the invention.
Figure 4B:
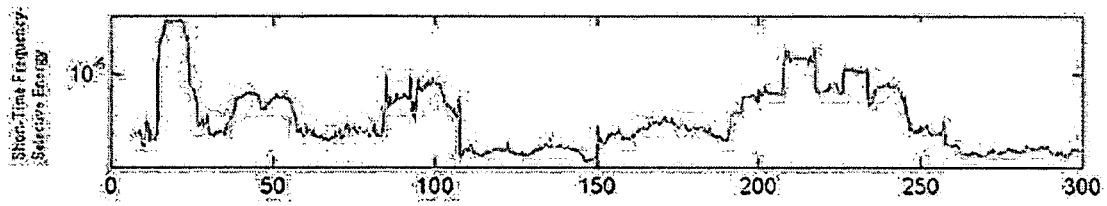
Figure 4C:
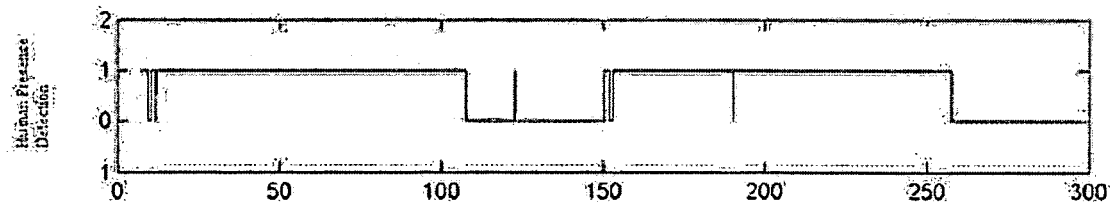
Figure 4D:
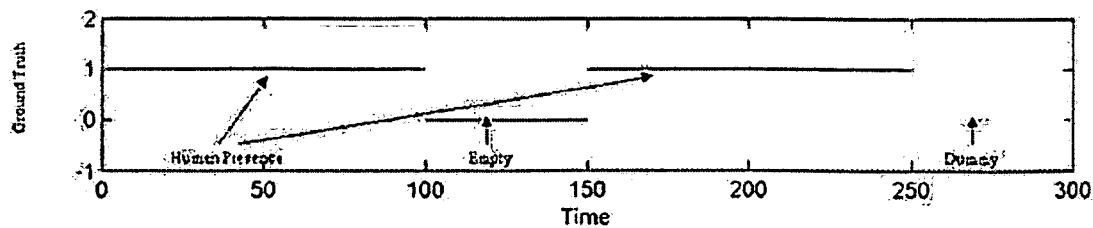

FIGS. 4a, 4b, 4c, and 4d are graphical representations that illustrate a general result of human being presence detection in accordance with the invention. FIG. 4d is useful to illustrate that the human presence detection of FIG. 4c corresponds to the ground truth represented in FIG. 4d.

Figure 5:
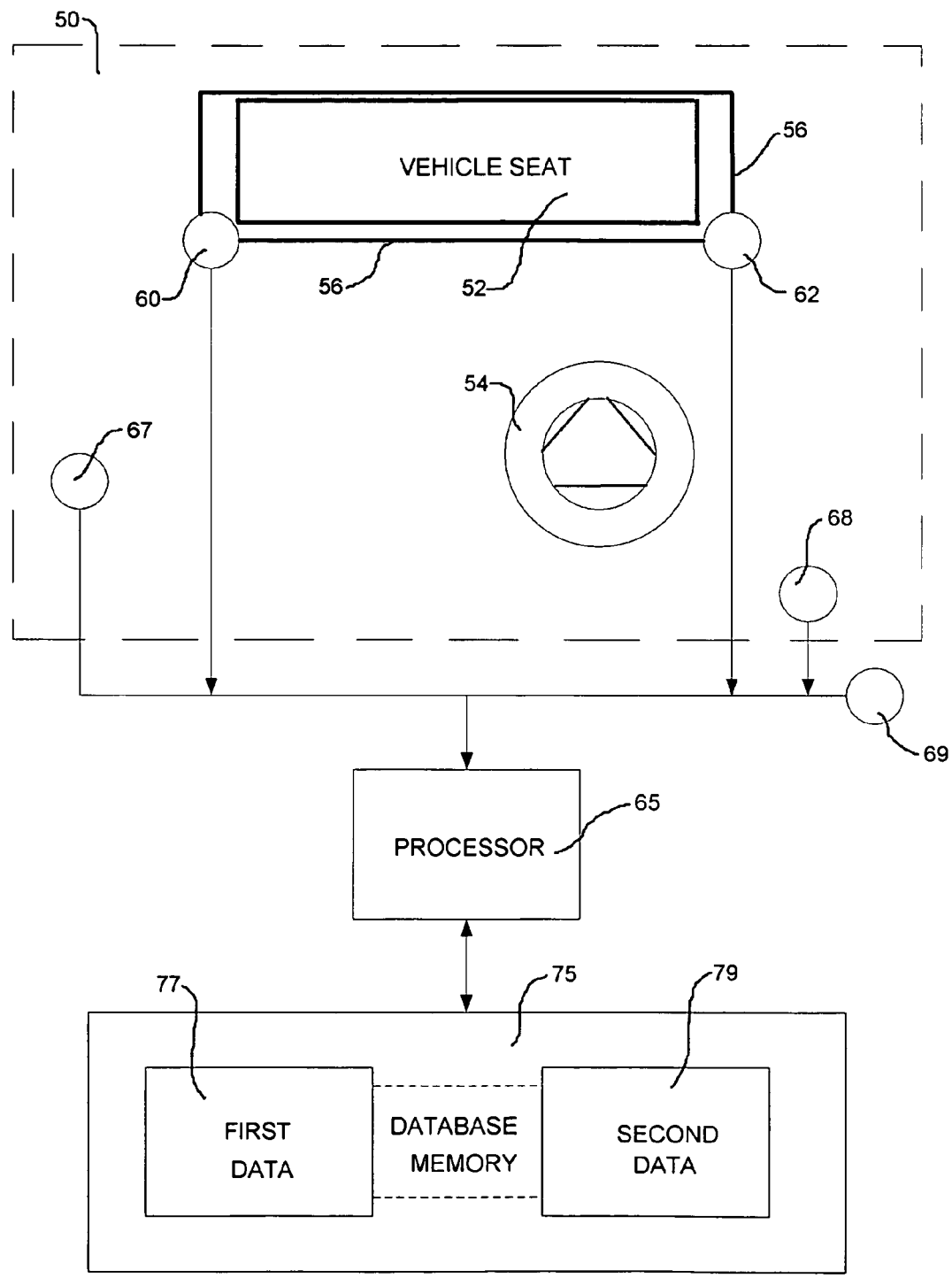
FIG. 5 is a simplified schematic illustration of a specific illustrative arrangement of certain structural elements arranged in accordance with the principles of the invention.

FIG. 5 is a simplified schematic illustration of a specific illustrative arrangement of certain structural elements arranged in accordance with the principles of the invention. As shown in this figure, a predetermined space in the form of a vehicle interior 50, within the dashed line in the figure, has a vehicle seat 52 therein, as well as a conventional steering wheel 54. There are provided on a seat frame 56 a pair of pressure transducers 60 and 62 that produce respective transducer signals responsive to the pressure applied to vehicle seat 52. The transducer signals are propagated to a processor 65 that computes one or more algorithms, as hereinabove described.

In accordance with the invention, there are additionally provided further transducers 67 and 68 within vehicle interior 50. An exterior transducer 69 is also shown in the figure to be provided. Transducers 67, 68, and 69 produce signals responsive to the location and movement of a person (not shown) on the vehicle seat, all of which signals being propagated to processor 65.

As stated, processor 65 employs data from a database memory 75 to compute, in some embodiments, an indication of the presence or absence of a human being on the vehicle seat. In other embodiments, the data from database memory 75 is used to identify certain behavioral characteristics of the human being, such as the level of alertness. Generally, the processor will make a determination between binary conditions, such as present or not present, or alert or not alert. Thus, the database memory will generally contain at least two memory regions 77 and 79 that contain data that would correspond to the two conditions being determined by the processor. For example, in an embodiment of the invention where the presence of a human being on the vehicle seat is to be determined, the first data would correspond to data representative of the human present condition, and the second data would correspond to data representative of the human absent condition.

Figure 6:
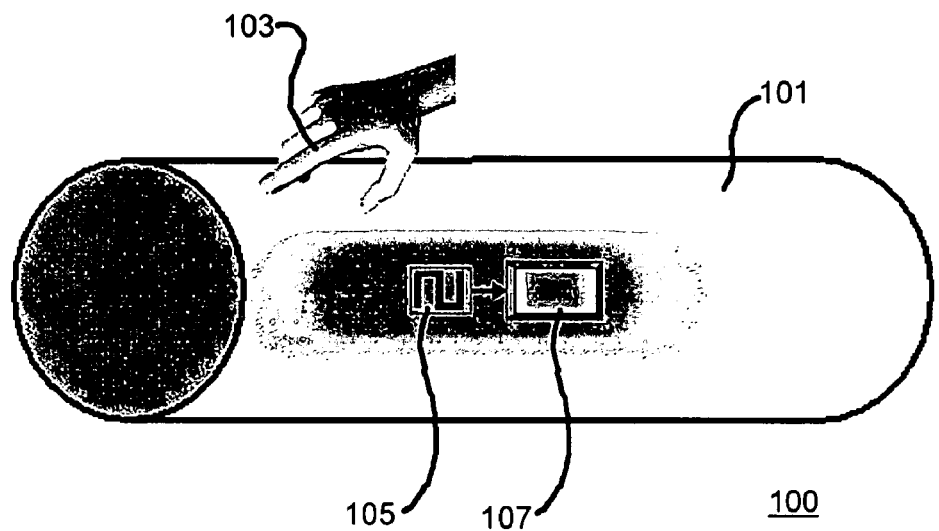
FIG. 6 is a simplified conceptual illustration of a specific illustrative embodiment of the invention applied to detecting the touch of a human being.

FIG. 6 is a simplified conceptual illustration of a specific illustrative embodiment of the invention applied to detecting the touch of a human being. As shown in this figure, a touch detection arrangement 100 has associated therewith an object of interest 101 which is shown to be touched by a hand 103 of a human being (not shown). The touch by hand 103 causes acoustic pressure signals (not shown) to be propagated throughout object of interest 101 and to a pressure transducer 105. In other embodiments, other forms of transducers, such as microphones, may be used in the practice of the invention.

In this specific embodiment pressure transducer 105 is contained within object of interest 101. The output of the transducer is propagated to a processor 107 that functions as hereinabove described.

Figure 7:
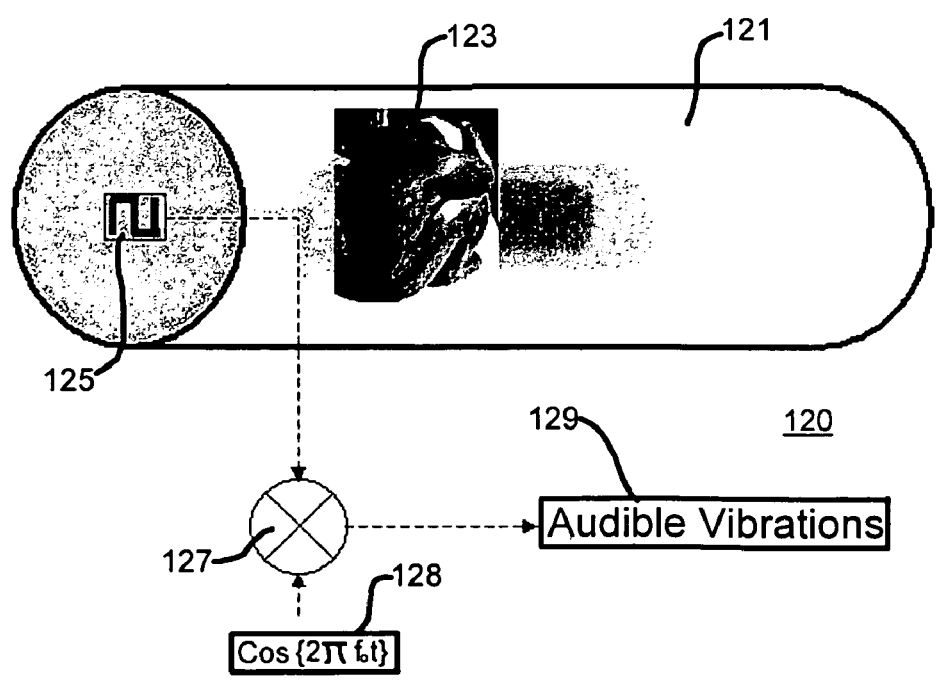
FIG. 7 is a simplified conceptual illustration of a specific illustrative embodiment of the invention applied to detecting the presence of a living being, illustratively a human being, contained within an object of interest.

FIG. 7 is a simplified conceptual illustration of a further specific illustrative embodiment of the invention applied to detecting the presence of a living being, illustratively a human being, contained within an object of interest. As shown in this figure, an object of interest 121, which defines an enclosed space, contains within it a living being, illustratively a human being 123. The human being is not visible from the exterior of the object of interest, and produces acoustic pressure signals (not shown), that are propagated throughout the object of interest. The pressure signals may include the heartbeat of the human being, and therefore contain subsonic frequency components.

The pressure signals generated by human being 123 are received by a pressure transducer 125 that produces a corresponding signal at its output. This signal is propagated to an input of a mixer 127 that receives at a second input thereof a carrier signal from a carrier signal generator 128. The carrier signal has a frequency $f_0$ that in this embodiment of the invention is within the sonic range. More particularly, 20 Hz$\leq f_0 \leq$20 kHz. Thus, the carrier signal is modulated by the pressure signals, and there are produced audible vibrations at a receiver 129 that correspond to the pressure signals modulated to an upwardly translated frequency ($f_0$) in the sonic range of frequencies.

Figure 8:
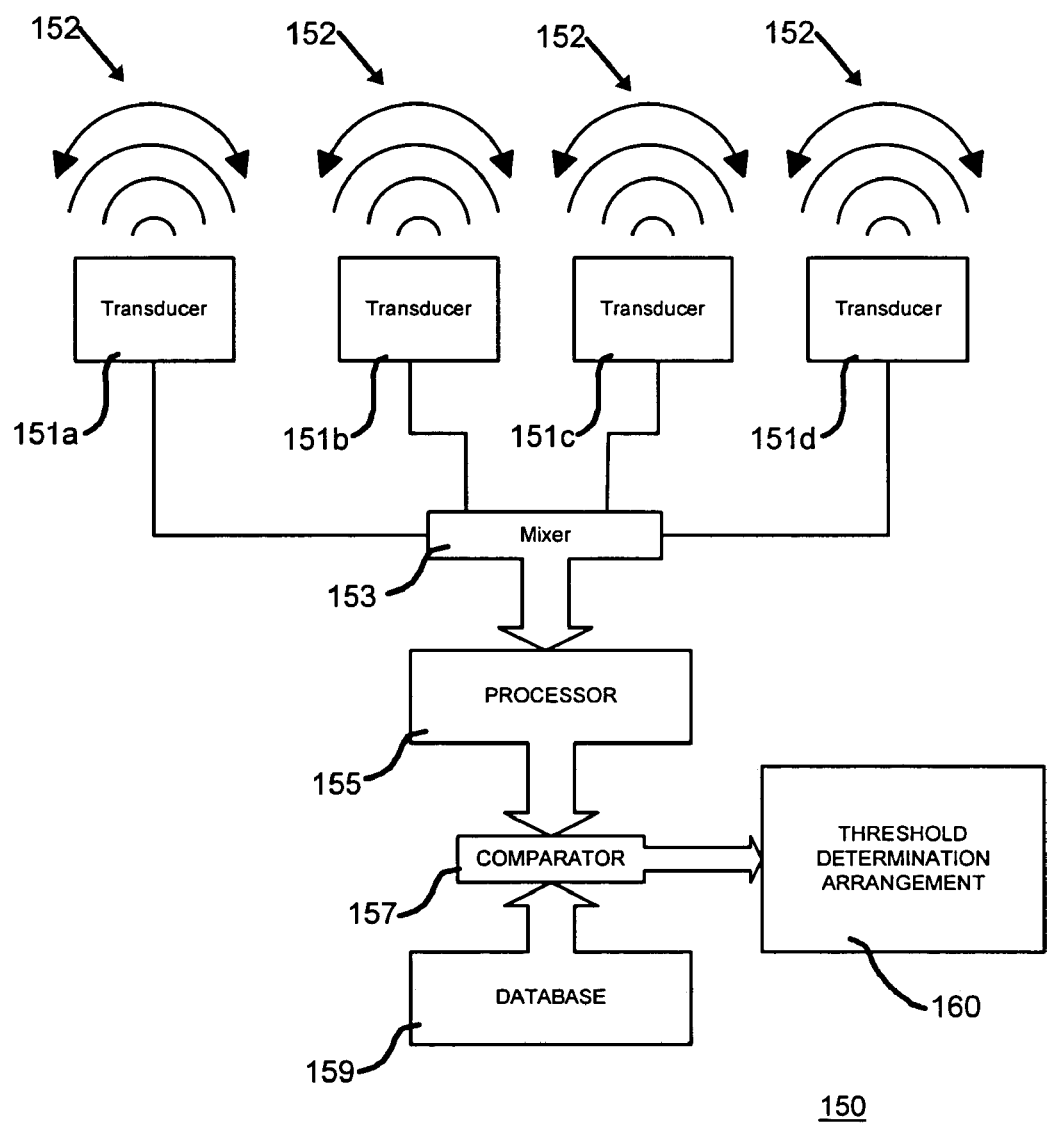
FIG. 8 is a function block diagram of a specific illustrative embodiment of one aspect of the present invention.

FIG. 8 is a function block diagram of a specific illustrative embodiment of one aspect of the present invention. As shown in this figure, a system 150 distinguishes between a first condition corresponding to a living subject (not shown in this figure) being directly in contact with an object of interest (not shown in this figure), and a second condition corresponding to the absence of contact between the living subject and the object of interest. Pressure signals 152 are produced by the living being and are propagated in this embodiment to a plurality of transducers 151a, 151b, 151c, and 151d. The present invention can be practiced with any number of transducers.

The transducers produce corresponding transducer signals that are propagated to a mixer 153. The output of the mixer is in the form of a signal that is received at an input of a comparator 157. The comparator receives at another of its inputs data that is stored in a database 159. In this embodiment, the processed data is conducted to a threshold determination arrangement 160. The threshold determination arrangement may, in certain embodiments of the invention, contain circuitry for producing an audible tone signal that is made available to a human listener (not shown). In such an embodiment, the human listener is trained, as hereinabove described. Alternatively, the threshold determination is automatically performed in response to pre-established, or programmed, threshold levels.

Figure 9:
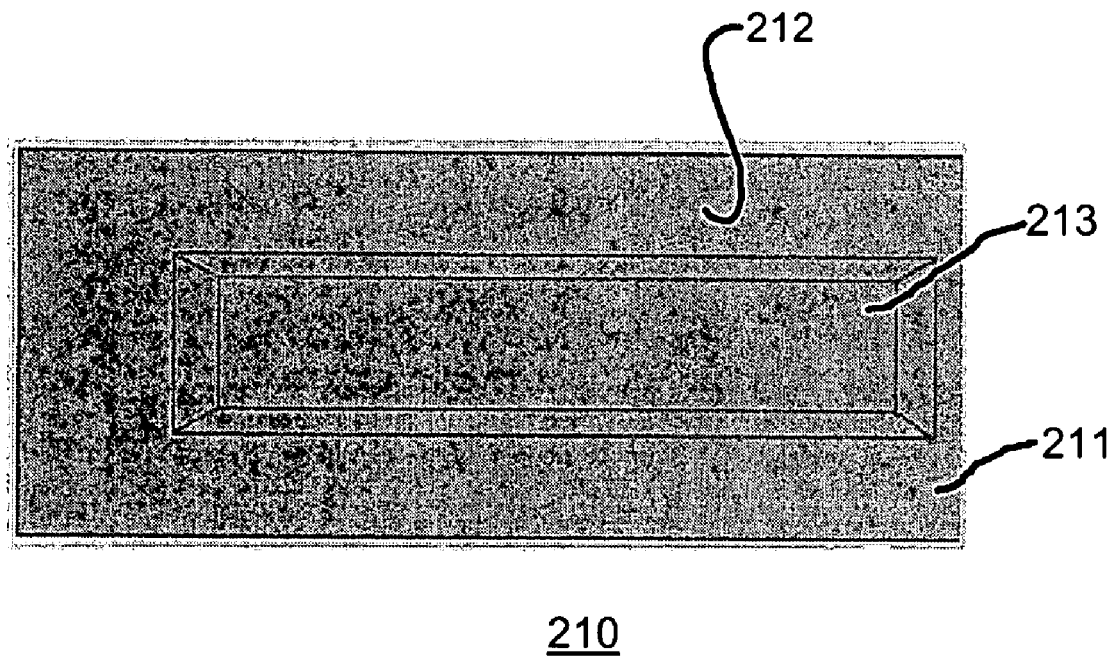
FIG. 9 is a top plan view of a flexible film sensor.

FIG. 9 is a top plan view of a flexible film sensor 210 in accordance with a further aspect of the invention. A substrate 211 has an adhesive backing (not shown in this view). The components of the sensor(s) are etched into and/or otherwise deposited onto substrate 211 by micro-electro-mechanical system (MEMS) technology. MEMS technology employs multiple deposition and etching steps to selectively add, or remove material, from a wafer, such as a silicon substrate. The result is a multilayered device comprising layers of semiconductors, insulators, and conductive materials forming the desired electro-optical devices. Referring to FIG. 9, an upper protective layer 212, that also may be formed of silicon, covers the components of the sensor(s). The sensor area is shown as raised area 213 in FIG. 9.

Figure 10:
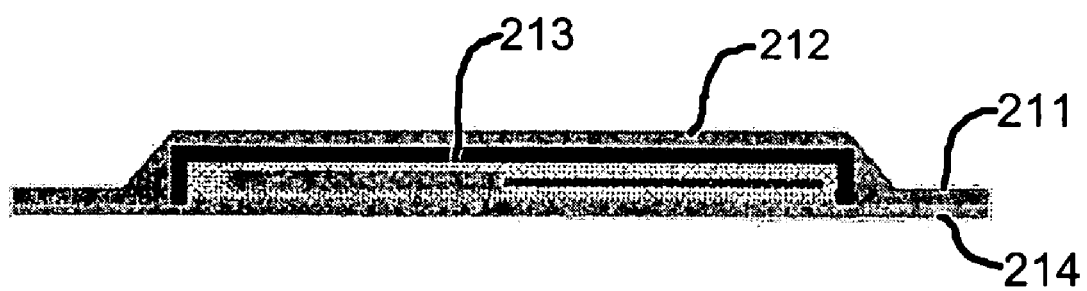
FIG. 10, which is a cross-sectional view of FIG. 9.

Referring to FIG. 10, which is a cross-sectional view of FIG. 9, substrate 211 has an adhesive backing 214. Sensors, which may be vibration and/or pressure sensors, in preferred embodiments, as well other components, including, but not limited to a signal process, a transmitter, a battery, and a microstrip antenna, are etched and/or deposited by MEMS techniques of the type known in the art. Of course, it is anticipated that other types of sensors, such as bio-chem sensors, can be incorporated into the flexible film sensor of the present invention.

Figure 11:
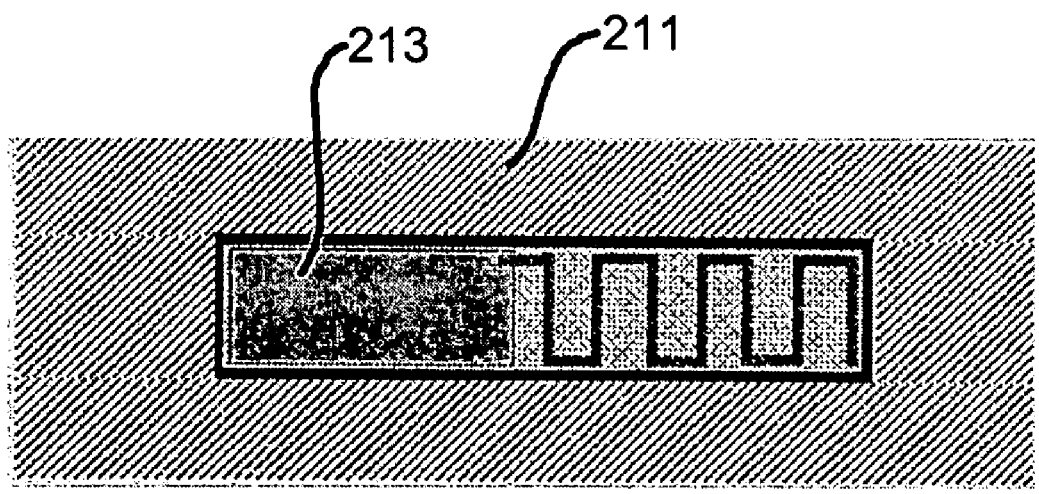
FIG. 11 is a top plan view, taken in cross section across raised section 13 of FIG. 9.

FIG. 11 is a top plan view, taken in cross section across raised section 213 of FIG. 9 showing embedded components.

MEMS-based technology has been employed in the art to provide an adhesive-backed flexible strip pressure sensor useful for monitoring and/or sensing tire pressure. A MEMS-based pressure sensor of this type is specifically within the contemplation of this invention. MEMS-based sensing devices suitable for use in the practice of the present invention can be purchased from MEMS Technology Berhad, Detroit, Mich.

The pressure signals are processed by a novel signal processing algorithm to determine the presence or absence of a human being, using information from different types of pressure transducers.

Figure 12:
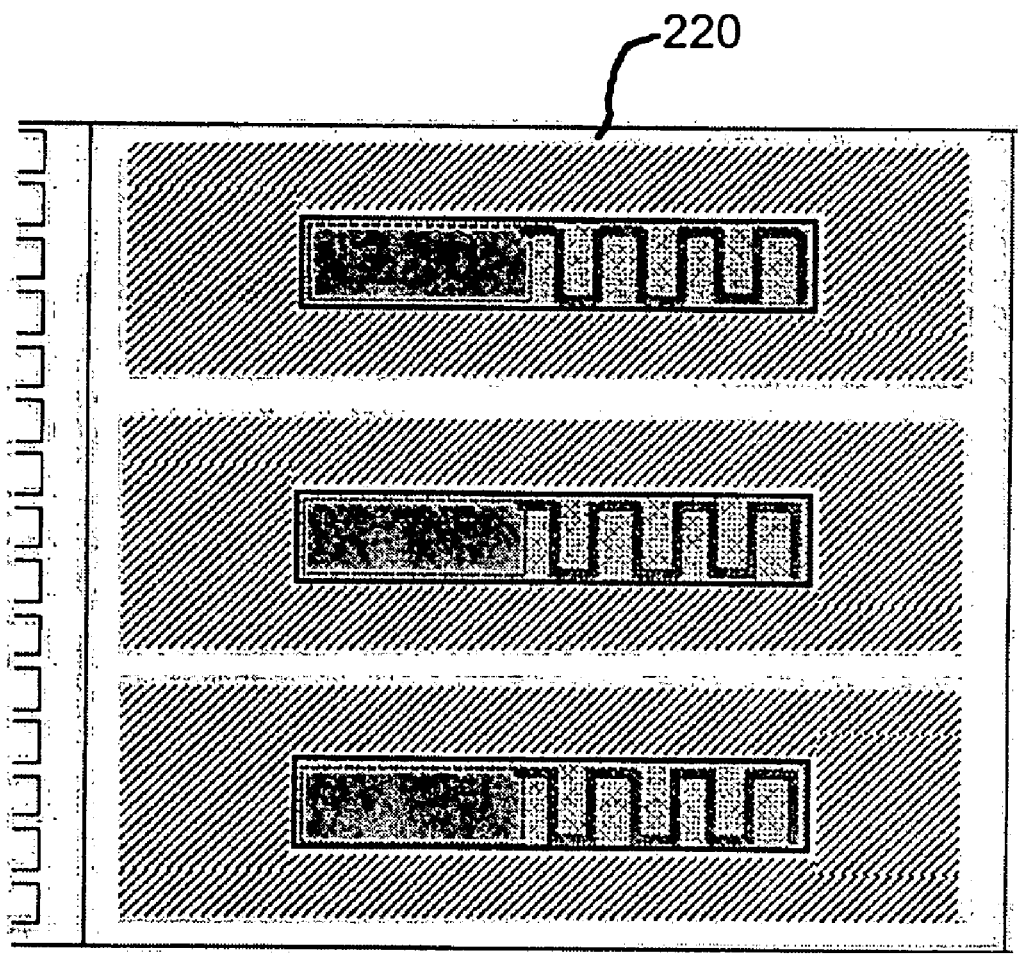
FIG. 12 is a top view of a plurality of individual strips of flexible film sensors obtained from a reel.

FIG. 12 is a top view of a plurality of individual strips 220 of flexible film sensors obtained from a reel. In accordance with a method of use aspect of the present invention, the flexible film sensor of the present invention, can be dispensed, for example, as a roll of a plurality of individual strips of flexible film sensors from a tape dispenser (not specifically shown in this figure). The entire cargo container or carton can be wrapped or encircled with the strips of flexible film sensors, or the periphery can be sealed with the sensors.

The flexible film sensors provide radio-frequency (RFID) and Wi-Fi signals to a remote user who would monitor the sensors at a control station, such as a computer terminal, a PDA, or other similar device.

Other characteristics of the present invention include:
Package:
   Flexible film
   Adhesive
   MEMS technology
Capabilities:
   Human presence detection
   Radio-frequency and Wi-Fi identification
   Tamper detection
   Inspection on 10 ft, 20 ft, and 30 ft containers in a few seconds
   Internet enabled
Sensors:
   Vibration
   Pressure
Applications:
   Container inspections
   Container security and integrity
   Vehicle inspections
   Autonomous inspections
Consumers:
   Port Security
   Border security
   Law enforcement
   Defense Although the invention has been described in terms of specific embodiments and applications, persons skilled in the art may, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A system for distinguishing between a first condition corresponding to a living subject being directly in contact with an object of interest, and a second condition corresponding to the absence of contact between the living subject and the object of interest, the system comprising:
   a transducer disposed in predetermined relationship to the object of interest, for producing a transducer signal responsive to a pressure wave resulting from the living subject being directly in contact the object of interest;
   a database for storing first data corresponding to the first condition and second data corresponding to the second condition;
   a processor for calculating an algorithm corresponding to a non-linear short-term frequency-selective energy distribution of the transducer signal over time to produce corresponding transducer signal data; and
   an arrangement for determining a threshold between the first and second conditions in response to the transducer signal data and the first and second data.

2. The system of claim 1, wherein the direct contact between the living subject and the object of interest constitutes a tap contact by the human subject of the object of interest.

3. The system of claim 1, wherein the direct contact between the living subject and the object of interest constitutes a stroke contact by the human subject of the object of interest.

4. The system of claim 1, wherein said transducer comprises an accelerometer.

5. The system of claim 1, wherein said transducer is disposed within the object of interest.

6. The system of claim 1, wherein there is further provided a modulation system for translating a selected frequency component of the transducer signal to a translated frequency within the frequency range between 0 Hz and 20 kHz.

7. The system of claim 6, wherein the translated frequency is within the audible range of a human listener, and there is further provided a training system for training the human listener to distinguish between the first and second conditions.

8. The system of claim 7, wherein the pressure wave corresponds to the heartbeat of the living subject, and the human listener is trained to listen to a signal corresponding to the frequency-translated transducer signal and distinguish between the first and second conditions.

9. The system of claim 8, wherein the signal corresponding to the frequency-translated transducer signal is a tone signal.

10. The system of claim 8, wherein the living subject is a human being.

11. The system of claim 6, wherein said modulation system comprises an amplitude modulator, having a carrier frequency in the range between 20 Hz to 20 kHz.

12. A system for distinguishing between a first condition corresponding to a living subject of a species of interest being directly in contact with an object of interest, and a second condition corresponding to the absence of contact between the living subject and the object of interest, the system comprising:

a transducer disposed in predetermined relationship to the object of interest, for producing a transducer signal responsive to a pressure wave resulting from the heartbeat of the living subject; and a modulation system for translating the frequency of the transducer signal.

13. The system of claim 12, wherein said modulation system translates the transducer signal to a translated frequency within the frequency range between 0 Hz and 20 kHz.

14. The system of claim 12, wherein there is further provided a filter arrangement for comparing the transducer signal to stored heartbeat data.

15. The system of claim 14, wherein said filter arrangement comprises a database for storing first data corresponding to a heartbeat of the species of the living subject.

16. The system of claim 15, wherein said filtering arrangement further comprises:

a processor for calculating an algorithm corresponding to a non-linear short-term frequency-selective energy distribution of the transducer signal over time to produce corresponding transducer signal data; and a comparator for comparing the transducer signal data to the first data.

17. The system of claim 15, wherein said filtering arrangement further comprises a processor for calculating an algorithm corresponding to a non-linear short-term frequency-selective energy distribution of the transducer signal over time to produce corresponding transducer signal data.

18. The system of claim 17, wherein said filtering arrangement further comprises an arrangement for determining a threshold between the first and second conditions in response to the transducer signal data and the first data.

19. The system of claim 18, wherein said database additionally stores second data corresponding to the second condition.

20. A system for distinguishing between a first condition corresponding to a living subject of a species of interest being directly in contact with an object of interest, and a second condition corresponding to the absence of contact between the living subject and the object of interest, the system comprising:

a plurality of pressure transducers disposed in predetermined relationship to the object of interest, for producing respective transducer signals responsive to pressure waves resulting from the heartbeat of the living subject;

a database for storing data corresponding to a heartbeat characteristic of the species of the living subject;

a processor for calculating an algorithm corresponding to a non-linear short-term frequency-selective energy distribution of the transducer signals over time, and for comparing the frequency-selective energy distribution of the transducer signals to the data in the database; and an arrangement for determining a threshold for distinguishing between the first and second conditions.

* * * * *